Patented June 14, 1938

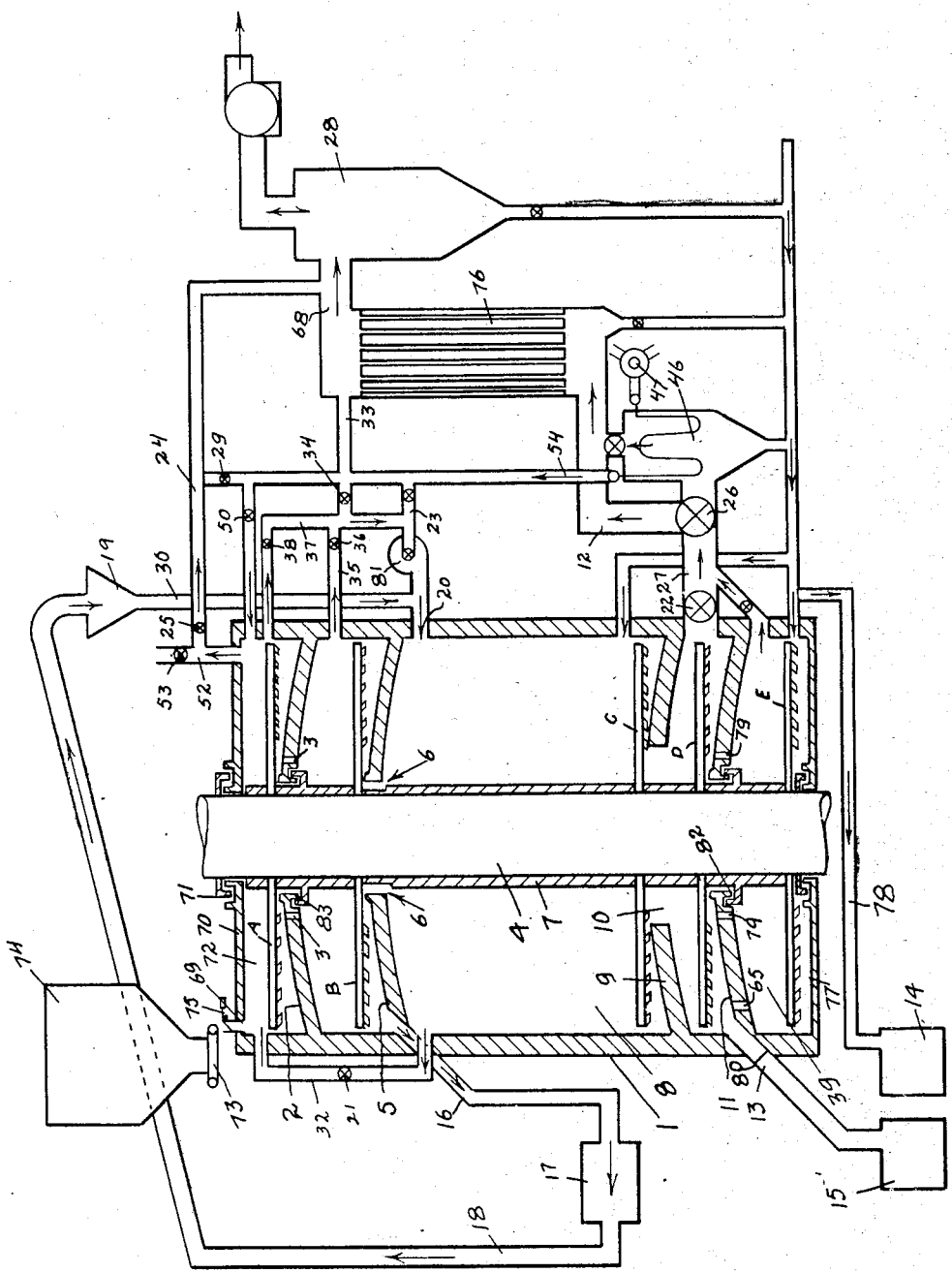

2,120,475

UNITED STATES PATENT OFFICE 2,120,475

APPARATUS FOR THE BURNING OF MINERAL SULPHIDES IN GASEOUS SUSPENSION-HEAT CONTROL

Byron Angus Stimmel, Kenneth Duncan McBean, and Graham Cruickshank, Trail, British Columbia, Canada, assignors to The Consolidated Mining & Smelting Company of Canada, Limited, Montreal, Quebec, Canada, a corporation of Canada Application May 22, 1936, Serial No. 81,314

7 Claims. (Cl. 266—20)

Our invention relates to the burning of mineral sulphides in gaseous suspension and is particularly directed towards providing a method and apparatus for the efficient utilization of the heat generated by the combustion of the sulphur content of the charge and a recovery of heat which otherwise would be wasted by means of which all types of charges usually encountered in industrial applications can be dried and burned without the use of supplemental heat from any extraneous source and at the same time economies can be effected in the original capital outlay and operating costs which, heretofore, have been considered impossible to realize.

In our United States Patents 1,963,282 and 1,884,348 we described a method and apparatus for the burning of mineral sulphides in gaseous suspension characterized in that the charge, in a finely divided state, is blown into the combustion chamber and is disseminated therein concurrently with an air blast through it for the exposure of each particle to the oxidizing action of the air. The roast is effected exclusively by the combustion of the sulphur content of the charge, supported only by the air of the blast, for converting the sulphides into metallic oxides, some sulphates and sulphur dioxide. The temperature and the time period of the roast are regulated for promoting the oxidation of the charge without fusion or incipient fusion and with the formation of a minimum amount of undesirable compounds such as zinc ferrates when treating zinc sulphides containing iron. The roasted material settling at the bottom of the combustion chamber is removed for further processing and the gaseous products of combustion are exhausted from the combustion chamber having a high concentration of sulphur dioxide particularly suitable for the manufacture of sulphuric acid or for further processing.

In the extensive industrial applications of our method and apparatus various types of mineral sulphides are encountered widely varying in thermal value and moisture content.

Considering first the burning of mineral sulphides of low thermal value and high moisture content it has not been possible heretofore to effect the drying and burning of the charge without the use of supplemental heat from some extraneous source to maintain the process in continuous operation. For example, in the case of treating very wet concentrates these would ordinarily have to be partially dried outside the furnace necessitating larger plant and one or more additional operations resulting in considerably higher costs, both capital and operating, or the heat value of the ore would have to be increased by the addition of extraneous fuel which would have a deleterious effect on the purity of the sulphur dioxide bearing gases evacuated from the process thereby increasing the cost of preparing those gases for subsequent processing such as for sulphuric acid manufacture or reduction to elemental sulphur.

Also, the usual roasting treatment of mineral sulphides heretofore has been accompanied by wasteful losses of heat which we are able to utilize to effect additional economies in the capital and operating costs of the process. In addition we recover the products in a higher state of purity and concentration than it has been possible to realize heretofore.

Among the principal objects of our invention is to incorporate improvements in the suspension burning method and apparatus by means of which the heat generated by the combustion of the sulphur content of the charge is so conserved that the types of concentrates usually encountered can be dried and subsequently burned in gaseous suspension without the addition of supplemental heat from any extraneous source.

A further principal object of our invention is to utilize efficiently the heat generated by the combustion of the sulphur content of the charge thus permitting heat, over and above that required to dry the charge and to maintain the temperature of combustion of the charge, to be utilized to generate power for processing purposes, thereby increasing the efficiency of the operations and lowering the cost thereof to a degree heretofore impossible to realize.

A still further object of our invention is to increase the productive capacity of the process and at the same time avoid a corresponding increase in the size of the associated parts necessary for treating the gaseous products of combustion thereby effecting still further economies in the original capital outlay and in the operating costs of the process.

Further objects of our invention and the manner in which we attain them will be apparent from the following description and accompanying drawing in which the furnace is shown in cross sectional elevation while the associated apparatus embodying the remainder of the process is shown schematically.

The shaft furnace 1 is constructed with a combustion chamber 8 of large cross sectional area and relatively great depth, so proportioned that the finely divided particles blown into the upper portion thereof have ample room for free dispersal throughout the chamber area for unrestricted downward movement therethrough in an oxidizing atmosphere to permit the substantially complete oxidation of the particles in gaseous suspension.

The settling hearth 9 at the lower part of the combustion chamber, on which the suspended particles eventually settle, has a circular opening 10, forming an annular opening around the insulating casing 7 of the vertical rotating shaft 4, which communicates with the lower settling hearth 11. The roasted particles settling on the hearth 11 may be evacuated from the oxidizing atmosphere of the combustion chamber through the conduit 13 which communicates with the storage bin 15, or through the drophole 65 provided in the hearth 11 to settle on the bottom hearth 77 where they are subjected to a strong atmosphere of sulphur dioxide for control of sulphate sulphur prior to being discharged by the screw conveyor 78 into the bin 14. The holes 79 in the hearth 11 permit entry of hot sulphur dioxide bearing gas from the combustion chamber 8 into the sulphating chamber 39 formed between the hearths 11 and 77.

The hearth 11 fits closely around the insulating casing 7 of the shaft 4 and passage of the gases from the chamber between hearths 9 and 11 down through this opening into the sulphating chamber 39 is inhibited by the usual type of lute ring seal 82.

The drying hearths 2 and 5 are located above the combustion chamber 8. The hearth 2 fits closely around the insulating casing 7 of the shaft 4 and passage of the gases from the lower drying chamber up through this opening into the upper drying chamber 72 is inhibited by means of the usual type of lute ring seal 83. The hearth 2, superimposed over the hearth 5, is provided with drop-holes 3 spaced at regular intervals about the rotating shaft 4, but preferably slightly removed therefrom for reasons that will appear hereinafter.

The cover 70 formed over the top drying hearth 2 is attached to the upper portion of the side walls of the furnace and extends over the drying hearth 2 totally enclosing that hearth to effectively prevent leakage of the hot gases from or dilution of the hot gases within the chamber 2 formed between the cover 70 and the hearth 2, and by virtue of its insulation conserves the heat of these gases. While there are many forms of seals available to seal the opening between the cover 70 and the rotating shaft 4, we prefer to use a sand seal 71 which effectively prevents the leakage of any gas therethrough.

The lower drying hearth 5 is so constructed as to form an annular gas conduit 6 between the hearth 5 and the insulating casing 7 of the shaft 4. This conduit 6 is preferably partly recessed into the insulating casing 7 by removal of one of the two layers of insulating brick therefrom to a sufficient depth for the purpose.

The drop holes 3 are spaced a sufficient distance from the shaft 4 to inhibit particles of the charge from dropping through the annular space 6 into the combustion chamber and this annular space 6 is further kept clear of the particles of the charge by a scraper attached to the shaft 4.

Referring first to the parts relating to the actual treatment of the mineral sulphides, the wet concentrates in the hopper 74 are fed, by means of the conveyor 73, into the small chute or hopper 69 which is provided with a self-opening counterbalanced damper 75. When the desired weight of material is accumulated in the chute 69 the damper opens dropping the charge on to the top drying hearth 2. The damper then returns to its normal position closing the chute 69 to the passage of any gas therethrough from the chamber 72.

The rabble arm A, with the rabbles suitably adjusted, moves the particles across the hearth 2 to drop through the drop-holes 3 on to the hearth 5 whereon they are moved outwardly by the action of the rabbles attached to the rabble arm B, towards the periphery and into the conduit 16 substantially free from moisture.

One end of the conduit 16 communicates with the periphery of the lower drying hearth 5 and the other end with the ball mill or other suitable pulverizing apparatus 17. A suitable elevator 18 receives the pulverized material and raises it to the hopper 19. The conduit 30 directs the flow of material from the hopper 19 into the nozzle 20 through which the particles of the charge are blown, in a finely divided state, into the combustion chamber concurrently with a blast of an oxidizing gas.

Rabble arms C, D, and E, secured to the rotating shaft 4, are provided with rabbles which move on the hearths 9, 11, and 77 respectively. The rabbles are so adjusted as to rabble the material on those hearths respectively towards and into the annular opening 10, the conduit 13 and/or into the drop-hole 65 if desired to continue the processing of the roasted material in the sulphating chamber 39 the latter step being accomplished by regulating valve 80 in conduit 13, after which the material drops onto the hearth 77 and is discharged into bin 14.

The associated apparatus suitable for utilizing the heat conserved in the combustion of the sulphur content of the charge comprises the heat exchanger 46, the waste heat boiler 76 and suitable dust collecting apparatus 28 such as a cyclone separator, electrostatic precipitator etc., either singly or in combination, all suitably connected as hereinafter shall be explained.

The main gas conduit 27, provided with valve member 22 communicates with the chamber between hearth 9 and hearth 11, with the base of the heat exchanger 46 and with the conduit 12 which communicates with the waste heat boiler 76. The two-way valve 26 located at the point of union of the conduits 27 and 12 provides means for diverting part or all the hot gases evacuated from the combustion chamber 8 into the conduit 12 to pass directly into the waste heat boiler 76 or into the heat exchanger 46 as desired.

The hot gases after circulating through the heat exchanger 46 pass into the conduit 12 and into the waste heat boiler 76.

An oxidizing gas such as air or oxygen enriched air is circulated through the tubes of the heat exchanger 46 by means of the fan 47.

One end of the conduit 54, which is preferably insulated, communicates with the tubes of the heat exchanger 46 and the other end with the drying chamber 72. The valve member 50 is provided in the conduit 54 to regulate the flow of the hot gases into the drying chamber 72. A further valve member 29 is provided in the conduit 54 by means of which the hot oxidizing gas can be evacuated to the atmosphere if so desired.

One end of the conduit 23 communicates with the conduit 54, the other end with the nozzle 20. The fan 81 draws the gas through the conduit 23 forcing it under pressure through the nozzle 20 together with the finely divided dry particles of the charge from the hopper 19.

The conduit 68 extends from the top of the waste heat boiler 76 to the dust collecting apparatus 28.

The conduit 37, provided with the valve member 38, extends from the top drying chamber 72 to the conduit 23. The conduit 33 extends from the top of the waste heat boiler 76 to the conduit 37 and is provided with the valve member 34.

The conduit 35 extends from the top of the lower drying chamber to the conduit 23 and is provided with a valve member 36.

The conduit 52 extends from the drying chamber 72 to the atmosphere and is provided with the valve member 53. The conduit 24 extends from the conduit 52 to the conduit 68 and is provided with the valve member 25.

In operation the charge is fed into the furnace through the chute or small hopper 69, the accumulated weight thereof opening the normally closed counterbalanced damper 75 to drop onto to the top drying hearth 2. The wet particles are rabbled across the hearth 2 whereon they are exposed to the drying action of the hot gases entering the drying chamber 72 through the conduit 32 or the conduit 54, the volume of the gases so admitted being regulated by the valves 21 and 50 respectively. We prefer to only partially dry the particles on this hearth removing say 40%–50% of the total moisture. When this partial drying is performed by hot air from heat exchanger 46 and conduit 54 through valve 50, moisture laden gases are substantially free from any entrained dust particles and, if desired, may be evacuated directly to the atmosphere without incurring any metal losses.

The drying of the particles is completed on the lower hearth 5 by the action of the hot gases from the combustion chamber passing freely through the annular opening 6. The particles leaving the drying step of the process into the conduit 16 are substantially free from moisture and an ideal product for subsequent pulverizing in the mill 17.

The finely divided dried particles of the charge are fed in regulated amounts from the hopper 19 to the nozzle 20 by means of the conduit 30, and are blown into the combustion chamber 8 concurrently with a blast of an oxidizing gas forced under pressure through the conduit 23.

The temperature of the combustion chamber is maintained exclusively by the combustion of the sulphur content of the charge supported only by the oxidizing gas introduced concurrently with the finely divided particles.

The majority of the suspended particles eventually settle on the settling hearth 9 whereon they are rabbled inwardly toward the opening 10, to settle on the hearth 11 whereon they are rabbled outwardly toward the periphery into the conduit 13 substantially free from sulphates and sulphur, or into the drop-hole 65 for sulphate control.

The method of utilizing the sensible heat generated by the combustion of the sulphur content of the charge is dependent on the thermal value and/or the moisture content of the charge being treated. For the purpose of illustration the following types of charges which are usually encountered in normal operation and the manner in which we prefer to utilize the sensible heat generated in order to maintain the process in continuous operation without the use of extraneous heat are set out hereinafter. It will be apparent of course that modifications may be made without departing from the scope of our invention.

*Method 1.*—For the treatment of concentrates of average thermal value with average moisture content, say from 30–32% sulphur, about 2000 B. t. u. per pound, and from 8–10% moisture.

The gaseous products of combustion are evacuated from the combustion chamber 8 through the main gas conduit 27. By regulating the two-way valve 26 the hot gases flow through the conduit 12 directly into the base of the waste heat boiler 76 thereby short circuiting the heat exchanger 46. The oxidizing gas, circulated through the tubes of the heat exchanger 46 by the fan 47, is not preheated but passes into the conduit 23 at substantially atmospheric temperature to act as a combustion and suspension medium for the finely divided dry particles of the charge. Part of the cooled exit gases from the boiler 76 may be returned through the conduit 33 to the combustion chamber to reduce and control the temperature therein, the remainder of the cooled exit gases flow to the dust collecting apparatus 28.

The concentrates charged on the drying hearth 2 are partially dried thereon by passing regulated amounts of hot gases from the upper portion of the combustion chamber through the conduit 32 into the drying chamber 72. The cooled gases from the drying chamber 72 are returned to the combustion chamber through the conduit 37 by suitable adjustment of the valve 38, to maintain the temperature of that chamber within desired limits.

The partially dried concentrates drop through the openings 3 onto the hearth 5 where the remainder of the moisture is removed by the hot gases entering from the top portion of the combustion chamber through the annular opening 6. The dried particles are rabbled towards the periphery of the drying hearth 5 into the conduit 16 and the gases are evacuated through the conduit 35 by adjustment of the valve 36.

*Method 2.*—For the treatment of concentrates of average thermal value with high moisture content, say from 10–14% moisture the same procedure would be followed as in the case of Method 1 except in regard to drying, where it will be necessary to by-pass a larger proportion of the hot gases from the combustion chamber through the conduit 32 into the drying chamber 72 to reduce the moisture content of the charge to the desired percentage before passing it to the drying hearth 5. The moisture laden gases evacuated from the drying chamber 72 are withdrawn through the conduit 24 to the dust collecting apparatus 28 in this instance. The partial drying of this type of charge on the hearth 2 permits the removal of the bulk of the original moisture before the concentrates are passed to the lower drying hearth. The moist gases are evacuated from the drying chamber 72 to the dust collecting apparatus 28 substantially free from entrained dust particles. In this way the hot gases circulating in the lower drying chamber and which are returned to the combustion chamber do not carry a large moisture burden into the furnace. This is a distinct advantage in that the furnace is not cooled by returning this moisture to the combustion chamber.

*Method 3.*—For the treatment of concentrates of above average thermal value with average moisture content the same procedure would be followed as in the case of Method 1, more sensible heat being recovered in the waste heat boiler for the reason that it will be necessary to cool the exit gas in the boiler 76 and return part of the cooled gas to control the temperature of the combustion chamber within operating limits.

*Method 4.*—For concentrates of above average thermal value with above average moisture content, say over 32% sulphur and 2000 B. t. u. per pound and from 10-15% moisture content.

Charges such as this are treated preferably as in Method 1. If the concentrates are excessively wet it will be necessary to use the by-pass drying method described in 2, namely introducing hot exit gases from the combustion chamber 8 into the drying chamber 72 through the conduit 32 after which the moisture laden gases may be passed out to the dust-collecting apparatus 28.

*Method 5.*—In the treatment of concentrates of below average thermal value with average moisture content the hot exit gases are passed through the heat exchange device 46 by adjustment of the valve 25 to give up part of their sensible heat to an oxidizing gas circulating through the tubes by means of the fan 47. The hot oxidizing gas may then be used in the combustion chamber as secondary combustion air and used therein for the dissemination and combustion of the finely divided particles by passing it directly through the tubes of the heat exchange device to the nozzle 20. Drying is effected as in Method 1.

*Method 6.*—For concentrates of below average thermal value and above average moisture content, say from 1600 to 2000 B. t. u. per pound and from 10-15% moisture content, the combustion of the particles in the combustion chamber is supported by the preheated oxidizing gas from the heat exchanger 46. The drying of the charge is effected by by-passing part of the hot exit gases from the combustion chamber into the drying chamber 72 thence through the conduits 52 and 24 to the dust-collecting apparatus 28.

*Method 7.*—In the treatment of concentrates which are very wet, say 14% moisture or over and/or in such cases where the exit gas must not contain appreciable moisture, as in the case of chamber acid manufacture, valve 31 in conduit 32 is closed and with valve 50 open, the hot air from the heat exchanger 46 is passed into the drying chamber 72 and is evacuated to the atmosphere through the conduit 52, the valve 53 being opened and the valve 25 closed, thereby removing the bulk of the moisture content of the charge completely from the process and at the same time eliminating any danger of incurring metal losses.

It will be clear from the above that we are able to use our apparatus for drying and for maintaining the temperature of combustion of a range of concentrates of a wide variety of thermal value and moisture content by selecting the proper method required to utilize efficiently the heat of combustion of the sulphur content of the charge. In this manner it is possible now to treat successfully types of concentrates which heretofore could not be treated with such heat economy and it is possible now to recover sufficient power to operate the entire mechanical requirements of the process and to make available heat for processing purposes besides.

In the treatment of concentrates of average or above average thermal value, as referred to in Methods 1, 2, 3 and 4 above, surplus heat, in excess of the heat required for drying and maintaining the desired temperature of combustion, is available for use. In order to reduce and control the temperature of the combustion chamber 8 within operating limits, this surplus heat is removed from combustion chamber 8 by circulating a portion of the exit gases, cooled in waste heat boiler 76, back to chamber 8, thereby increasing the rate of gas flow through and the supply of heat to the boiler 76, and recovering this surplus heat for processing requirements if desired. For example when roasting zinc concentrates at the rate of 100 tons per day, we are able to recover approximately 200 boiler horse power in the waste heat boiler.

In addition, concentrates such as described in Methods 5, 6 and 7, the drying and the burning of which have heretofore required supplemental heat from some extraneous source, can be dried and burned exclusively by the heat generated from the combustion of the sulphur content of the charge, thereby entailing a very low operating cost. In these cases, where it may also be of great importance to deliver the produced gases with as high a concentration of sulphur dioxide and as free from adulterants as possible, the previously described methods of using our apparatus ensure that these gases are evacuated from the process in a high state of purity and concentration suitable for further processing, such as sulphuric acid manufacture or reduction to elemental sulphur. If, in these cases, supplemental heat were to be supplied by use of extraneous fuel in the combustion chamber 8, these gases would be diluted and contaminated with impurities, which in many instances would be undesirable, and which would greatly increase the cost of subsequent processing.

However, in the treatment of concentrates of low thermal value and high moisture content where the dilution and adulteration of the produced gases is of minor or no concern, and where it is particularly desirable to generate steam for processing requirements as cheaply as possible, then extraneous fuel may be utilized with very great efficiency in our process in the manner described below. Coarse coal or similar fuel is added to the drying hearth and later becomes pulverized in mill 17, to be finally injected into the combustion chamber 8 mixed with the finely divided particles of the charge, thereby furnishing additional heat, practically all of which, in this added fuel, is recovered by the waste heat boiler. In this way, the cost of crushing the coal outside the apparatus is eliminated.

In the extreme and unusual case where the mineral sulphides are too low in thermal value and are too high in moisture content to be treated according to our Methods 5, 6 and 7, since such concentrates would not of themselves furnish sufficient heat by combustion of their sulphur content to support combustion and to yield the required quality of calcine, and where the dilution and adulteration of the produced gases is of minor or no concern, it is still possible to adapt our method and apparatus to dry and burn such concentrates to give the required calcine, provided extraneous fuel be used in the manner described above. In this case the extraneous fuel together with the sulphur content of the concentrates themselves furnish sufficient heat for the continuous operation of the process, and the heat value of the fuel is utilized with great economy. Such procedure, involving an addition of extraneous fuel in the above manner, might be preferred to the method of using the heat exchanger on certain low thermal value ores in the case where the exit gases go to waste and where process steam is required, thus dispensing with the cost of insulation and operation of the heat exchanger.

In the case where it is desired to treat concentrates insufficiently fine for the concentrate burning process, and where dilution and adulteration of the produced gases is of minor or no concern, and where the cheap generation of steam for processing purposes is required, then further fine grinding of these concentrates, prior to drying, may be dispensed with by charging coarse coal or similar fuel with these coarse concentrates into the drying chamber 72, obtaining a mixing of the ore and fuel during the usual grinding procedure in mill 17, and thus obtaining a feed to nozzle 20 which will roast satisfactorily in combustion chamber 8. In this manner the costs of installation and operation of the heat exchanger 46 are dispensed with and a smaller plant for grinding these coarse concentrates, prior to feeding them into bin 74, is required than heretofore.

We have also found in operating our method and apparatus that the original capital outlay can be greatly decreased or the productive capacity of the equipment may be greatly increased without a corresponding increase in size. This feature results from conducting the drying in two or more steps, in closed circuit, which permits the rapid partial drying at relatively high temperatures in the first step, without the danger of incurring metal losses, and completing the drying in subsequent steps at relatively high temperatures. In addition, by utilizing the heat exchanger and waste heat boiler, the volume of the gases requiring treatment in the dust collecting apparatus are greatly decreased. The efficiency, life and capacity of this dust collecting apparatus is thus correspondingly increased. For example, dust collecting equipment, which formerly could treat the gases and dust burdens from a maximum of 65 tons of concentrates per day, is capable, as a result of the application of this invention, of treating the gases and dust burdens from 105 tons of concentrates per day.

It will be apparent that modification of our method and apparatus such as above may be made without departing from the scope of our invention.

What we claim is:

1. In combination with apparatus for roasting mineral sulphides in gaseous suspension, a plurality of drying chambers contiguous with the roasting chamber; a drying hearth located in each of said chambers and a cover affixed over the uppermost drying hearth; means for introducing regulated quantities of moist sulphides into the uppermost drying chamber to settle on the drying hearth; means for introducing into said uppermost drying chamber regulated quantities of hot gases to effect the partial drying of the charge therein; means for separately evacuating the moisture laden gases from the uppermost drying chamber and means for passing the partially dried particles to a lower drying chamber where substantially the remainder of the moisture is eliminated.

2. In combination with apparatus for roasting mineral sulphides in gaseous suspension according to claim 1, means by which the flow of hot gases to the uppermost drying chamber and the drying of the charge on the hearth therein are regulated in such a manner that the moisture laden gases evacuated therefrom are substantially free from entrained dust particles.

3. In combination with apparatus for roasting mineral sulphides in gaseous suspension as claimed in claim 1, means by which regulated quantities of the hot combustion gases are introduced into the uppermost drying chamber to effect the partial drying of the charge therein and regulated quantities of the moisture laden gases are separately evacuated from the uppermost drying chamber to pass into the combustion chamber and used to regulate the temperature thereof.

4. In combination with apparatus for roasting mineral sulphides in gaseous suspension, a plurality of drying chambers contiguous with the roasting chamber; a drying hearth located in each of said chambers; means for introducing mineral sulphides into the uppermost drying chamber to settle on the drying hearth; means for introducing into said uppermost drying chamber regulated quantities of hot gases to effect the partial drying of the charge therein, means for moving the sulphides progressively to a lower drying hearth whereon they are exposed to the drying action of hot gases and finally separately evacuated therefrom substantially free from moisture; a roasting chamber adapted to roast the particles of the charge in gaseous suspension; a conduit communicating with the upper part of the roasting chamber and the uppermost drying chamber and means for controlling the flow of the hot combustion gases through said conduit.

5. In combination with apparatus for roasting mineral sulphides in gaseous suspension, a plurality of drying chambers contiguous with the roasting chamber; a drying hearth located in each chamber; means for introducing mineral sulphides into the uppermost drying chamber to settle on the drying hearth; means for introducing regulated amounts of hot gases into the uppermost drying chamber to effect the partial drying of the charge therein; means for moving the sulphides progressively to a lower drying hearth whereon they are exposed to the drying action of hot gases and finally evacuated therefrom substantially free from moisture; a roasting chamber adapted to roast the particles in gaseous suspension; means for separately evacuating the solid and gaseous products of the roasting chamber; heat exchange means located in the path of flow of the hot exit gases, said heat exchange means adapted to pre-heat an oxidizing gas useable in the drying and combustion chambers; a second heat exchange device located in the path of flow of the exit gases from the first mentioned heat exchange device, said second heat exchange device adapted to convert the heat of the hot combustion gases into available energy and means for regulating the flow of the hot combustion gases into the respective heat exchange devices dependent on the thermal value and moisture content of the charge being treated.

6. In combination with apparatus for roasting mineral sulphides in gaseous suspension as claimed in claim 5, means for by-passing the hot combustion gases directly into the second mentioned heat exchange device.

7. In combination with apparatus for roasting mineral sulphides in gaseous suspension as claimed in claim 5, means by which regulated quantities of the cooled exit gases from the second mentioned heat exchange device are returned to the combustion chamber.

BYRON ANGUS STIMMEL.
KENNETH DUNCAN McBEAN.
GRAHAM CRUICKSHANK.